United States Patent
Wood et al.

(10) Patent No.: US 7,501,626 B2
(45) Date of Patent: Mar. 10, 2009

(54) MICROMECHANICAL THERMAL SENSOR

(75) Inventors: Roland A. Wood, Bloomington, MN (US); James A. Cox, New Brighton, MN (US); Robert E. Higashi, Shorewood, MN (US); Fouad A. Nusseibeh, Champlin, MN (US)

(73) Assignee: Honeywell International Inc., Morristown, NJ (US)

( * ) Notice: Subject to any disclaimer, the term of this patent is extended or adjusted under 35 U.S.C. 154(b) by 320 days.

(21) Appl. No.: 11/446,806

(22) Filed: Jun. 2, 2006

(65) Prior Publication Data

US 2007/0278407 A1 Dec. 6, 2007

(51) Int. Cl.
*G01J 5/00* (2006.01)
(52) U.S. Cl. .................................. 250/338.1
(58) Field of Classification Search .... 250/338.1–338.5
See application file for complete search history.

(56) References Cited

U.S. PATENT DOCUMENTS

| | | | |
|---|---|---|---|
| 5,220,188 A | 6/1993 | Higashi et al. | 257/467 |
| 5,220,189 A | 6/1993 | Higashi et al. | 257/467 |
| 5,449,910 A | 9/1995 | Wood et al. | 250/338.1 |
| 5,534,111 A | 7/1996 | Hocker et al. | 216/15 |
| 5,895,233 A | 4/1999 | Higashi et al. | 438/107 |
| 6,036,872 A | 3/2000 | Wood et al. | 216/2 |
| 6,316,770 B1 * | 11/2001 | Ouvrier-Buffet et al. | 250/338.1 |
| 6,329,655 B1 * | 12/2001 | Jack et al. | 350/338.1 |
| 2004/0140429 A1 * | 7/2004 | Jack et al. | 250/338.1 |
| 2006/0081781 A1 * | 4/2006 | Bluzer | 250/338.4 |

OTHER PUBLICATIONS

U.S. Appl. No. 11/350,541, filed Feb. 9, 2006 entitled "Spectrometer Method and Apparatus for Near Infrered to Terahertz Wavelengths" (Inventors: J.A. Cox, R. A. Wood, B. S. Fritz).
"Terahertz Active Direct Detection Imagers" E. N. Grossman et al. Quantum Electrical Metrology Division, National Institute of Standards and Technology Prol. SPIE vol. 5411, pp. 68-77, Sep. 2004.

* cited by examiner

*Primary Examiner*—David P Porta
*Assistant Examiner*—Kiho Kim
(74) *Attorney, Agent, or Firm*—Kris T. Fredrick

(57) ABSTRACT

A radiation sensor that can operate in the THz regime comprising: a micro antenna, which may comprise a two-dimensional patterned thin-film metallizations on a thin dielectric pellicle fabricated by micro machining of a silicon wafer; a thermally isolated microstructure; a coupling mechanism for coupling the energy from the micro antenna to the microstructure, the coupling mechanism providing high thermal isolation between the micro antenna and the microstructure; a temperature signal detector on the microstructure; and signal processing electronics for receiving the temperature signal and processing it into useful data.

20 Claims, 8 Drawing Sheets

MICROMECHANICAL THERMAL SENSOR

FIELD OF THE INVENTION

The invention pertains to sensors for detecting radiation. More particularly, the invention pertains to a micromechanical sensor that may be used as detectors in spectrometers.

BACKGROUND OF THE INVENTION

Sensors for detecting radiation are useful in many fields and applications. One of those fields is spectroscopy. Spectroscopy is a scientific technique by which electromagnetic radiation from a given source is broken down into its wavelength components and those components are analyzed to determine physical properties of the source of that radiation. Particularly, the wavelengths of radiation that are or are not in the spectrum are indicative of the atoms or molecules that are in the source of the radiation. The term "source" herein encompasses not only objects that generate radiation, but also objects that merely reflect, transmit, or absorb radiation emitted by another source.

Spectroscopy and spectrometers have powerful and important applications in many fields of science and technology. For example, spectroscopy and spectrometers are used extensively in astronomy to determine the composition of stars and other objects in space. Spectroscopy and spectrometers also are used in military and security applications, such as in the identification of substances that might be inside of buildings, underground, concealed on persons or otherwise not directly observable. Spectrometers also can be used to scan persons and luggage (at airports, for instance) to determine if the person is carrying (or the luggage contains) certain types of items, such as plastic explosives or metal objects, such as firearms.

U.S. patent application Ser. No. 11/305,541 entitled Spectrometer Method and Apparatus For Near Infrared to Terahertz Wavelengths filed Feb. 9, 2006 discloses an exemplary spectrometer architecture that can be adapted for use across a very wide spectrum of bandwidths, and is incorporated fully herein by reference. Such spectrometers employ one or more sensors for detecting the radiation that is received in the spectrometer.

Within these spectra, one can study emission and/or absorption lines, which are the fingerprints of atoms and molecules. Every atomic element in the periodic table of elements has a unique spacing of electron orbits and, therefore, can emit or absorb only certain energies or wavelengths. Thus, the location and spacing of spectral lines is unique for each atom and, therefore, enables scientists to determine what types of atoms are within a radiation source from its unique signature spectrum.

Spectroscopy based on atomic spectral lines is primarily appropriate for visible wavelengths. In the near infrared (IR) range (which is roughly 0.75-3.0 microns), midwave IR range (about 3.0-8.0 microns), and longwave IR range (about 8.0-30 microns), the dominant mechanism responsible for spectral absorption bands are not transitions between electronic energy levels, but rather transitions between molecular vibrational energy levels. In the far IR range, sometimes referred to as the Terahertz or THz range (about 30-3000 microns), molecular rotational energy levels are the dominant mechanism.

Primarily in the THz regime (far IR), there is an even further physical mechanism that spectroscopy can be used to detect. Specifically, solid materials exhibit different spectra based on the absorption spectra of the material's crystalline lattice vibrations (so called phonon spectrum), which lie mostly at far IR wavelengths (THz frequencies). The principle is the same, but the fundamental mechanism for spectral emissions is lattice vibrations rather than molecular vibrations or rotations. This is useful for detecting explosives, drugs, etc.

Even further, continuous spectra (also called thermal spectra) are emitted by any object that radiates heat, i.e., has a temperature above absolute zero. The light (or other electromagnetic radiation) is spread out into a continuous band with every wavelength having some amount of radiation. Accordingly, the magnitude of radiation at a given wavelength or wavelengths may be used to determine the general composition of an object and/or its temperature or density.

A non-imaging spectrometer observes the spectral components of all the radiation from a given source as a single unit. On the other hand, an imaging spectrometer separately detects the radiation from different points in a given field of view and determines the spectral components for each of those points separately (i.e., pixelation). Thus, for instance, a non-imaging spectrometer may employ a single sensor for detecting the radiation from an object, whereas an imaging spectrometer would comprise an array of sensors and some optical apparatus to guide the radiation into the array such that each sensor receives radiation from a different portion or point within the overall field of view being observed.

In any event, spectrometers as well as other types of scientific, industrial and military equipment utilize radiation sensors for detecting radiation.

U.S. Pat. Nos. 5,220,188 and 5,220,189 disclose one particular micromechanical thermoelectric sensor element that can be used in spectroscopy for detecting radiation. In such a design, a micromechanical structure is suspended over a pit etched into a silicon substrate. A thermocouple is formed in the suspended structure which produces a voltage in response to a temperature change, which voltage can be provided to read out electronics so as to detect the presence of radiation (which was the cause of the temperature change).

There are many types of sensor designs that can be used to detect radiation in a spectrometer or other instrument. The particular technology most suitable for a particular application depends on the frequency range of the spectrometer or other instrument, different technologies being more economically suited to different wavelengths of radiation. In the near infrared wavelength range, the detector might comprise charge coupled devices, such as photoelectric detectors using either the photoconductive effect or photovoltaic effect, fabricated using MEMS technology. In the Terahertz range (roughly 0.1 THz to 20 THz), on the other hand, a thermal detector, such as a thermoelectric (TE) microbridge detector would be a more suitable choice as a sensor. Such microbridge detectors can be manufactured using MEMS technology. Some particular TE microbridge detectors are disclosed in U.S. Pat. Nos. 5,220,188, 5,220,189, 5,449,910, and 6,036,872, owned by the same assignee as the present patent application. U.S. Pat. No. 5,220,188 discloses a basic etch-pit type of microbolometer IR detector. U.S. Pat. No. 5,220,189 discloses a basic thermoelectric (TE) type IR detector. Subsequent improvements to these designs are described in, for instance, U.S. Pat. Nos. 5,449,910, 5,534,111, 5,895,233, and 6,036,872. Also, Golay cells are known for use in sensing in the THz range.

The U.S. government and other organizations are interested in the development of spectrometers that can operate in the THz regime with very high sensitivity, e.g., having a signal to noise ratio of 1:1 or better at 1 pico-watt per root Hertz of electrical bandwidth, pW/vHz. As previously noted, spectroscopy in the THz regime can be useful for detecting concealed drugs and explosives. Therefore, there is a need for an extremely sensitive and reliable radiation detector that can operate in the THz regime.

Therefore, it is an object of the present invention to provide an improved radiation sensor.

SUMMARY OF THE INVENTION

In accordance with the principles of the invention, a radiation sensor that can operate in the THz regime comprises: a micro antenna, which may comprise a two-dimensional patterned thin-film metallization on a thin dielectric pellicle fabricated by micro machining of a silicon wafer; a thermally isolated microstructure; a coupling mechanism for coupling the energy from the micro antenna to the microstructure; a temperature signal detector on the microstructure; and signal processing electronics for receiving the temperature signal and processing it into useful data.

The electrical impedance of the microstructure should be designed so as to be impedance matched with the micro antenna so that radiation from the micro antenna that enters the detector is dissipated as heat when it enters the microstructure. The coupling mechanism may be either ohmic or capacitive, a capacitive coupling generally providing better thermal isolation. The temperature signal detector may take the form of a bi-metal thermocouple near the middle of the microstructure, at the point where it is most thermally isolated from the substrate. Alternately, the microstructure may bear one plate of a capacitor, the other plate being on the substrate and wherein temperature induced motion of the microstructure changes the capacitance of the capacitor. The read out circuitry can take any reasonable form. Sigma-delta analog-to-digital circuits are particularly suitable circuits for coupling the temperature change signal to the readout electronics.

DETAILED DESCRIPTION OF THE INVENTION

Figure 1:
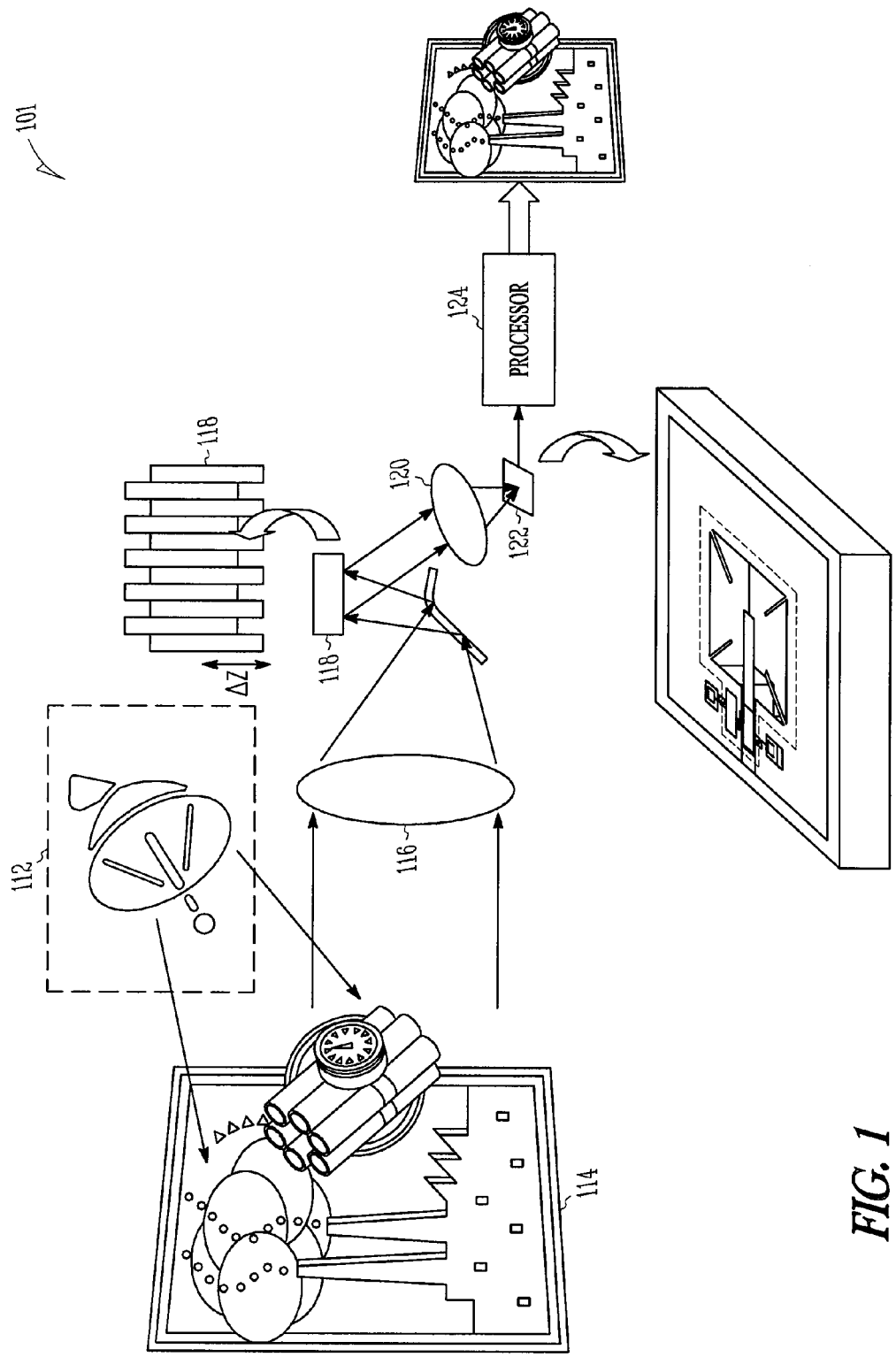
FIG. 1 is a schematic diagram of an exemplary spectrometer into which a radiation sensor in accordance with the principles of the present invention may be incorporated.

FIG. 1 is a schematic diagram of the basic components of an exemplary THz range two-dimensional imaging Fourier transform spectrometer 101 incorporating a microbridge radiation sensor in accordance with the principles of the present invention. This type of spectrometer may have application in airport security for scanning persons or luggage for explosives, firearms, and other contraband items. An illumination source 112 illuminates an object or scene 114 (hereinafter generically "object") the composition of which it is desired to know. The object may be a piece of luggage or a person. As a practical matter, the luggage or person probably would have to be positioned in a particular location in which they could be illuminated by the radiation source 112, such as a booth. In a preferred embodiment of the invention operating in the THz regime (about 100 GHz to about 20 THz), the illumination source 112 emits radiation in a specific bandwidth within that range.

With the active illumination source 112, the object will absorb radiation of certain wavelengths from source 112 and thus reflect a modified radiation spectrum. The object will have a particular absorption spectrum based on the atoms and molecules that make up that object. The radiation from the illumination source 112 that is reflected off of the object 114 is collected by an optical system 116 and brought to bear upon a lamellar grating interferometer 118 or other means of breaking the radiation into its spectral components. The optical system 116 can be a conventional reflective, refractive, or catadioptric design.

The radiation output from the interferometer 118 is focused by a second optical system 120 onto a detection system 122 in accordance with the principles of the present invention. In an imaging spectrometer, the detection system 122 may comprise an array of sensors. It may be a two-dimensional array of sensors (for example, a grid of 100×100 sensors) or a one-dimensional array that is scanned over a field of view. Alternately, a fixed one-dimensional array of sensors can be employed and the object passed transversely through the field of view of the one-dimensional array. Finally, the detection system may comprise only a single sensor that is scanned to produce an image.

Of course, a single detector that is not scanned can be used in a non-imaging spectrometer.

In any event, the detector(s) convert the radiation signals into electrical signals, which are fed into a processing unit 124 for processing, storage, and analysis.

Figure 2A:
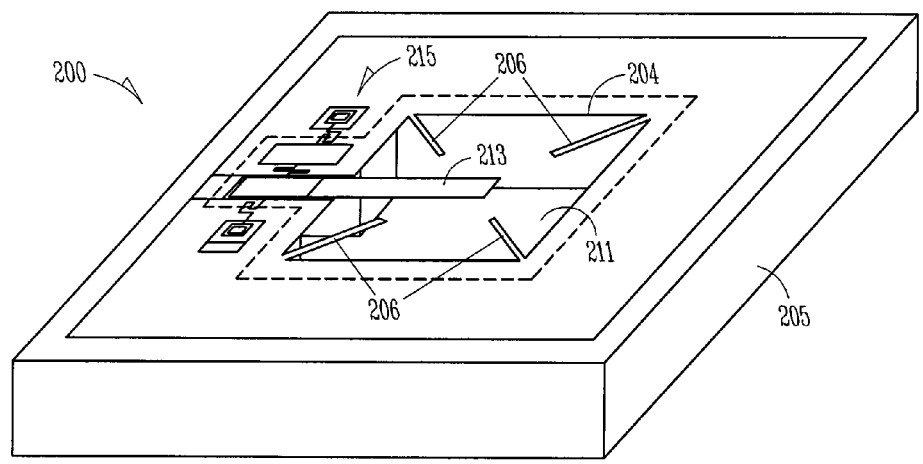
FIG. 2A is a perspective view of a thermoelectric radiation sensor in accordance with the principles of the present invention.
Figure 2B:
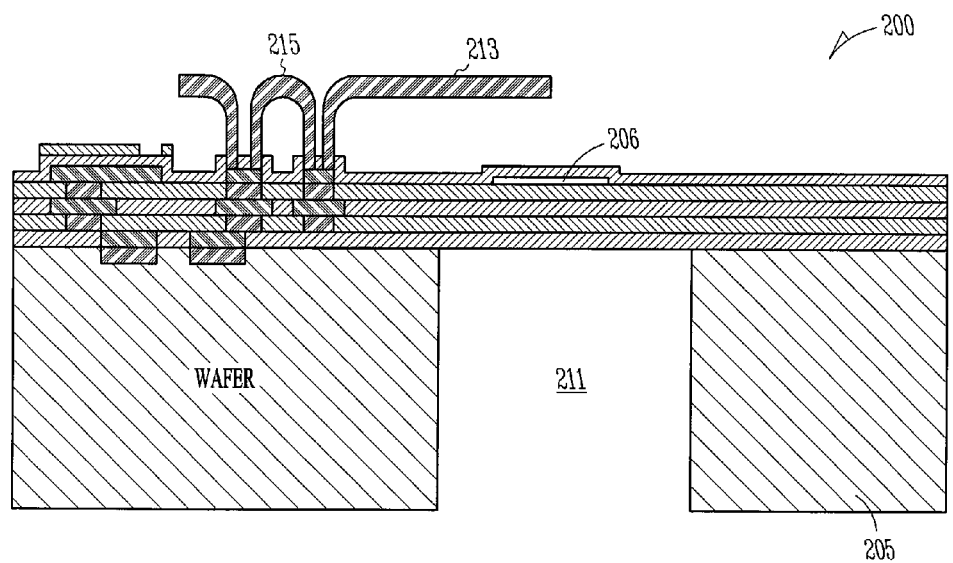
FIG. 2B is a side elevation view of the thermoelectric radiation sensor shown in FIG. 2A.

FIGS. 2A and 2B are perspective and side elevation views, respectively, of a sensor 200 in accordance with the principles of the present invention that can be used as sensor 122 in the spectrometer shown in FIG. 1. This sensor is particularly suited to collecting and measuring radiation in the THz range. The sensor is an uncooled microbridge that can operate in the THz range. This sensor 200 comprises a micro antenna 204 comprising four antenna elements in the form of bars 206 of silicon suspended over an etched pit 211 in the silicon substrate 205. The bars 206 are plated with metal in order to make their surfaces conductive and they are sized, shaped, and arranged relative to each other so as to have resonance in the frequency bandwidth within which it is wished to detect radiation.

Various techniques for etching the pit 211 are widely known and any such technique may be used. Aforementioned U.S. Pat. Nos. 5,220,188 and 5,220,189 discuss at least one reasonable technique. Furthermore, micromachining techniques are known for creating the silicon bars 206 and plating them with metal. While the bars 206 may be created such that they are cantilevered over the pit 211, they also may be supported by a pellicle (not shown), also in accordance with well known semiconductor fabrication techniques. The pellicle is a very thin, transparent-to-radiation film that may, for instance, be formed of silicon nitride.

A microstrip 213 is suspended over the pit 211 and bars 206. The microstrip 213 resonantly couples to the energy received by the micro antenna and carries the energy to a microstructure 215.

Figure 3A:
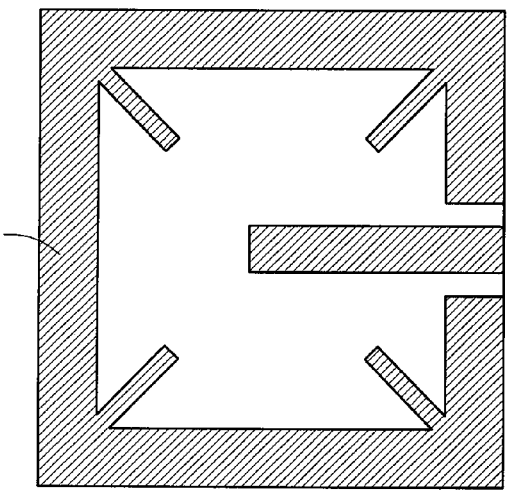
FIGS. 3A-3C are plan views of three alternate micro antenna layouts that can be used in connection with the micro antenna of FIG. 2A.
Figure 3B:
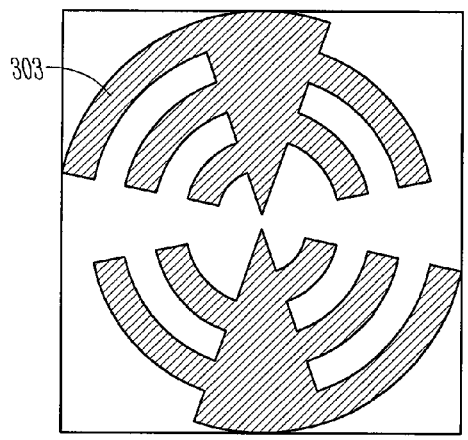
Figure 3C:
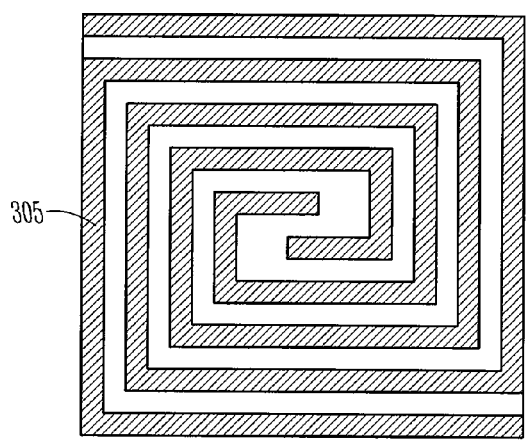

FIGS. 3A-3C illustrate three different exemplary layouts of the antenna elements, each of which has its own advantages and disadvantages. FIG. 3A is the same square slot layout 301 seen in FIG. 2A and has the advantages of providing simple and low risk coupling. It also is polarization independent and has a bandwidth of about 1.5-2.5 THz and a gain of about 5±0.7. FIG. 3B shows a log periodic layout 303 of the antenna elements. It also provides simple resistive coupling. However, capacitively coupling to this type of antenna is difficult. This layout is polarization dependent and, therefore, more suitable for use in applications where the source of radiation 112 emits polarized radiation. It has a wider bandwidth than the square slot embodiment of FIG. 3A, about 1.3-2.7 THz, and similar gain of about 5±0.7. FIG. 3C shows a spiral layout 305 of the antenna elements and has the advantages of simple resistive coupling. However, capacitively coupling to this type of antenna is difficult. It is polarization independent and has a very broad bandwidth of about 0.5-3.0 THz and a high gain of about 7±0.5.

One of the features of the sensor of the present invention that permits it to achieve very high sensitivity without requiring cooling is the high degree of thermal isolation provided between the collection of the radiation (i.e., in the micro antenna) and the detection of the radiation (i.e., in the microstructure).

Figure 4:
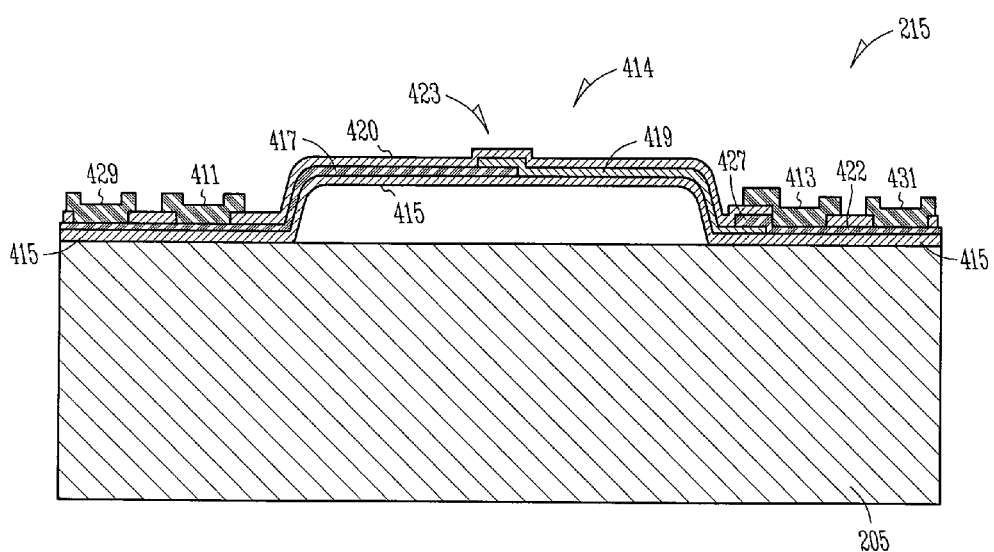
FIG. 4 is a side elevation view illustrating the microstructure, coupling mechanism and temperature signal detector of the sensor of FIGS. 2A and 2B in accordance with one particular embodiment of the present invention employing a resistive coupling mechanism.

FIG. 4 is an enlarged side elevation view illustrating the microbridge 215 of FIGS. 2A and 2B and illustrating its features in accordance with a first embodiment of the invention in more detail. For comparative scale purposes, note that, whereas FIG. 2A shows about a 500 micron square section of silicon, the long dimension of the microbridge in FIG. 4 (left to right in the figure) is about 10-50 microns. The view in FIG. 4 is the view looking in from the left in FIG. 2A.

The electrical output of the microstrip 213 is ohmically coupled to the microstructure through two contact pads 411, 413. The microstructure is a microbridge 414 suspended over the substrate and having a thermocouple in the middle, as explained in detail below. Specifically, a dielectric layer 415, such as silicon nitride is suspended over the substrate 205 by removal of a sacrificial layer and formed to provide the general shape of the microbridge 414. On the left hand side of the Figure, a layer 417 of a first metal, such as nickel iron (NiFe), is deposited on top of the silicon nitride 415 in the vicinity of the first antenna contact pad 411 and half way across the microbridge 414. On the right hand side of the Figure, a layer 419 of a second metal, such as chrome, is deposited on top of the silicon nitride layer 415 in the vicinity of the second antenna contact pad 413 and half way across the microbridge 215. In the middle of the microbridge, the NiFe layer 417 and the chrome layer 419 overlap for a short distance. Another dielectric layer 420 is formed on top of the microbridge 414. The overlapping layers of the two metals (NiFe and chrome) form the hot thermoelectric (TE) junction 423 of a thermocouple. Cold junction 427 of the thermocouple is positioned on the substrate at the end of either one of the NiFe or chrome layers. In FIG. 4 it is at the end of the chrome layer 419, where there is another junction of overlapping chrome 419 and NiFe 422. It should be understood by those familiar with the art of thermocouples that NiFe and chrome are merely exemplary materials. There are other suitable materials for forming thermocouples. Certain properties of the two materials merely should be selected relative to each other so as to optimize sensor performance. The typical properties of interest are electrical resistivity, thermal conductivity, and Seebeck coefficient.

The currents caused to appear in the antenna 206 by any incident radiation in its detection bandwidth are coupled to the microbridge 414 as previously mentioned. The current in the microbridge generates heat in the thermocouple 423. In accordance with the well known principles of thermocouples, the heat at the thermocouple generates a voltage differential between the hot TE junction on the microbridge and the cold TE junction 427 on the substrate at the foot of the microbridge. The voltage differential appears at the contact pads 429, 431 to which the read-out electronics are coupled. The read out electronics are not shown in the Figures, but can take any reasonable form. They may be embodied on the same silicon die as the micro antenna and microstructure 205. Alternately, the readout electronics may be embodied on a separate die.

Thus, in the parlance of the present specification, the microbridge 215 is the aforementioned "microstructure", the antenna contact pads 411, 413 comprise the "coupling mechanism" between the micro antenna and the microstructure, and the thermocouple comprises the "temperature signal detector". Note that the thermocouple essentially comprises both the hot and the cold TE junctions 423, 427. The microstructure 414 is the silicon nitride that is suspended above the substrate and upon which the metal layers 417 and 419 and hot thermocouple junction 423 are supported.

The temperature signal detector, i.e., the thermocouple 423 is well isolated from the substrate and the outside world by virtue of being in the middle of the microbridge as far as possible from the substrate. Accordingly, most of the heat generated in the microbridge goes to raising the temperature of the NiFe and chrome layers and is not lost in the substrate.

The Noise Equivalent Power (NEP) of the thermal detector of the present invention is given by the well-known equation $$NEP^2 = \frac{4k_b T R_{TE}}{\Re^2} + 4k_b T^2 G + 16\varepsilon\sigma k_b A T^5 + \frac{CI^\alpha}{f^\beta \Re^2}$$

where
$G = 3 \times 10^{-7}$ W/K (for Cr/NiFe metal film TE junction anchored to substrate;
$R_{TE} = 100\Omega$;
$C$ = thermal mass = $9 \times 10^{-12}$ J/K;
$S$ = Seebeck coefficient of TE junction = 61 μV/K;
$T$ = temperature;
$k_B$ = Boltzman's constant;
$\varepsilon$ = emmissivity of the microbridge;

σ=Stephan Boltzman constant;

$f^\beta$=frequency of the read-out electronics; and $I^\alpha$=electrical current.

The four terms added to each other in this equation are, respectively, from left to right, the Johnson noise, the thermal noise, the radiation noise, and the 1/f noise. Because the thermoelectric detectors do not require a bias current to create the temperature-change-induced voltage differential, there is no 1/f noise in this type of sensor.

If the detector is 1 micron wide and 0.1 microns thick and 50 microns long and made of Cr/NiFe, this yields a Noise Equivalent Power of $$NEP^2 = 4.02 \times 10^{-23} + 1.49 \times 10^{-24} + 1.55 \times 10^{-27} \, W^2/Hz$$

$$NEP = 6.5 \, pW/\sqrt{Hz}.$$

While this embodiment of the invention provides excellent thermal isolation of the temperature signal detector 423 from the outside world and therefore excellent performance, the temperature signal detector is in ohmic contact with the substrate. Hence, the microstructure is in thermal contact with the substrate such that some of the heat generated in the micro antenna is lost in the substrate, thus not providing optimal thermal isolation of the temperature signal detector from the outside world or from the micro antenna. Accordingly, the sensitivity achievable with this embodiment of the invention, while good, can be improved.

Figure 5A:
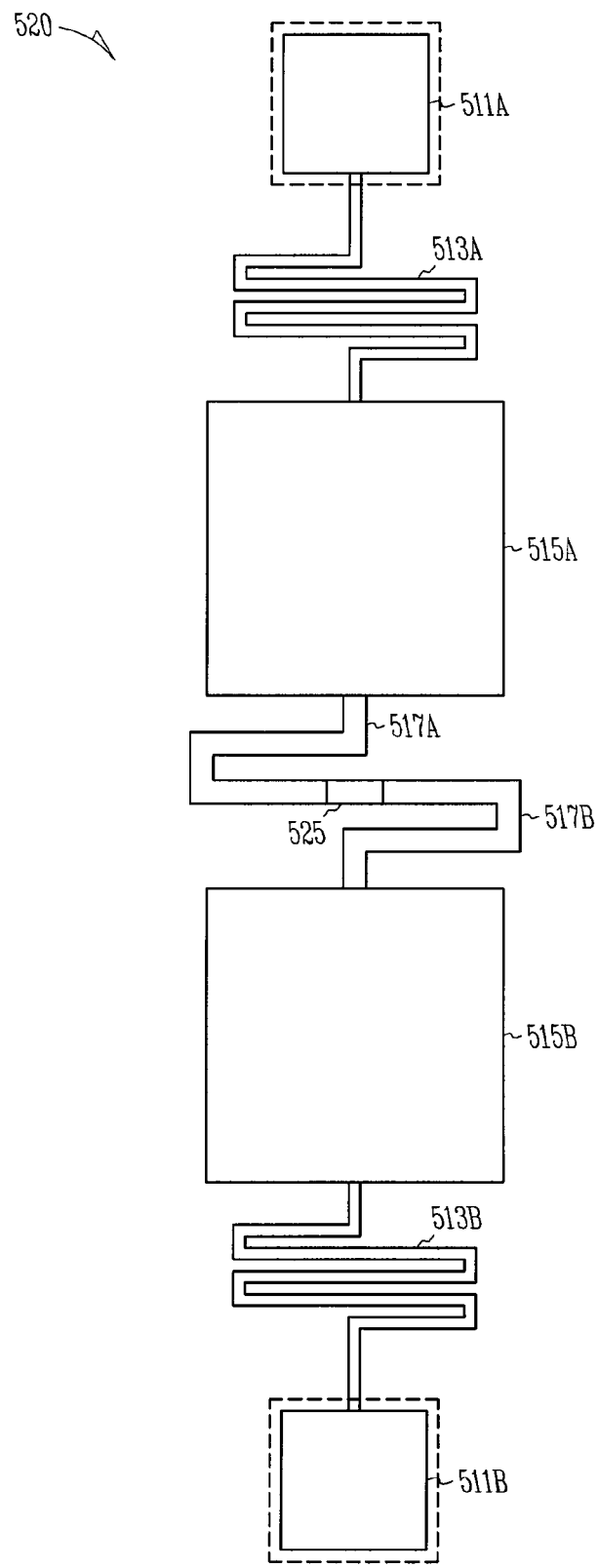
FIG. 5A is a plan view illustrating the microstructure, coupling mechanism and temperature signal detector of the sensor of FIGS. 2A and 2B in accordance with another particular embodiment of the present invention employing capacitive coupling mechanism.
Figure 5B:
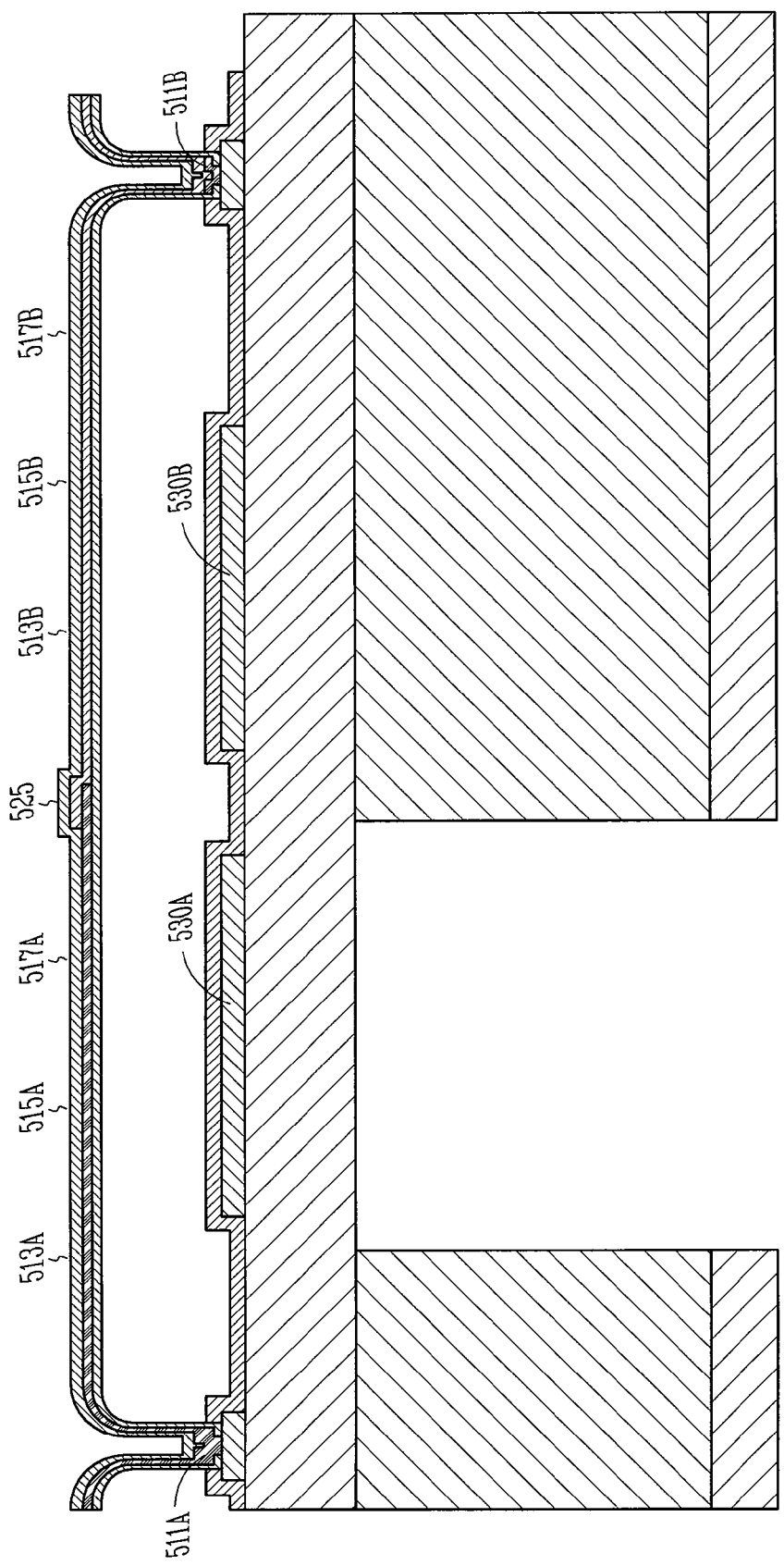
FIG. 5B is a side elevation view of the microstructure, coupling mechanism and temperature signal detector of FIG. 5A.

FIGS. 5A and 5B are plan and side elevation views, respectively, illustrating a second embodiment of the microstructure, coupling mechanism, and temperature signal detecting mechanism that can achieve even better thermal isolation of the temperature signal detector from the substrate and outside world than that of the FIG. 4 embodiment. In this embodiment, the microbridge is anchored to the substrate at two contact pads 511*a*, 511*b* and there is a thermocouple similar to the thermocouple described above in connection with FIG. 4. Everything seen in FIG. 5A other than the two contact pads 511*a*, 511*b* is suspended above the substrate. In addition to serving as the anchors for the microbridge structure, the contact pads 511*a*, 511*b* also serve as the contact pads to the read-out circuitry. Furthermore, either of the two contact pads 511*a*, 511*b* may serve as the cold TE junction by placing the other of NiFe or chrome under the chrome or NiFe at that pad since the cold TE junctions are essentially NiFe to chrome junctions.

As in the FIG. 4 embodiment, the microbridge 520 is fabricated from a material such as silicon nitride. The half of it that is between pad 511*a* and thermocouple 525 is plated with a first metal, such as NiFe, while the other half of it that is between pad 511*b* and thermocouple 525 is plated with a second metal, such as chrome. As in the FIG. 4 embodiment, the thermocouple 525 is formed in the middle of the bridge by a small section where the NiFe layer overlaps the chrome layer (or vice versa).

Emanating from each contact pad 511*a*, 511*b* is a serpentine thermal isolation leg 513*a*, 513*b*. The legs are serpentine in order to maximize their length and, therefore, the thermal isolation of the thermocouple 525 from the substrate. Coupled to the far end of the serpentine legs 513*a*, 513*b* are metal plates 515*a*, 515*b*. Each of these comprises the top plate of a capacitor, the bottom plate of each respective capacitor 530*a*, 530*b* being directly on the substrate and positioned directly beneath the plate 515*a*, 515*b*. The bottom plates of the capacitors 530*a*, 530*b* comprise the antenna contact pads, like pads 411, 413 in the FIG. 4 embodiment. Emanating from the far side of the plates 515*a*, 515*b* are further serpentine legs 517*a*, 517*b* that meet at thermocouple hot junction 525 as previously described.

In operation, the current running through the antenna contact pads 530*a*, 530*b* as the result of any radiation received by the micro antenna elements and transferred to the antenna pads as previously described will cause a voltage change in the antenna pads 530*a*, 530*b* that is transferred capacitively (i.e., without physical or ohmic contact) to the top plates 515*a*, 515*b*, thus causing a current in the NiFe and chrome layers on the microstructure. These currents cause the NiFe and chrome layers to heat up, which causes a voltage change at the thermocouple 525. As described above in connection with the FIG. 4 embodiment, that voltage change is referred through the NiFe and chrome layers, respectively, to cold TE junction 511*a* or 511*b* (which, as noted above, also may comprise the readout electronics contact pads) on the substrate and, therefrom to the read out electronics.

In this embodiment, the temperature signal detector, i.e., the thermocouple 525, is very highly isolated from the substrate. Particularly, it is physically attached to the substrate only at the read out electronics contact pads 511*a* and 511*b*. There is no physical or ohmic contact between the micro antenna and the microstructure, since they are electrically coupled to each other only capacitively.

Assuming that the microstructure in FIGS. 5A and 5B is 1 micron wide, 0.1 microns thick, and 50 microns long and $G = 1.5 \times 10^{-8}$;

$R_{TE} = 2700 \Omega$;

C=thermal mass=$6.5 \times 10^{-10}$ J/K; and

S=Seebeck coefficient for TE junction=61 µV/K, then we arrive at a total Noise Equivalent Power of $$NEP^2 = 2.77 \times 10^{-24} + 7.46 \times 10^{-26} + 1.55 \times 10^{-27} \, W^2/Hz$$

$$NEP = 1.7 \, pW/\sqrt{Hz}$$

Figure 6:
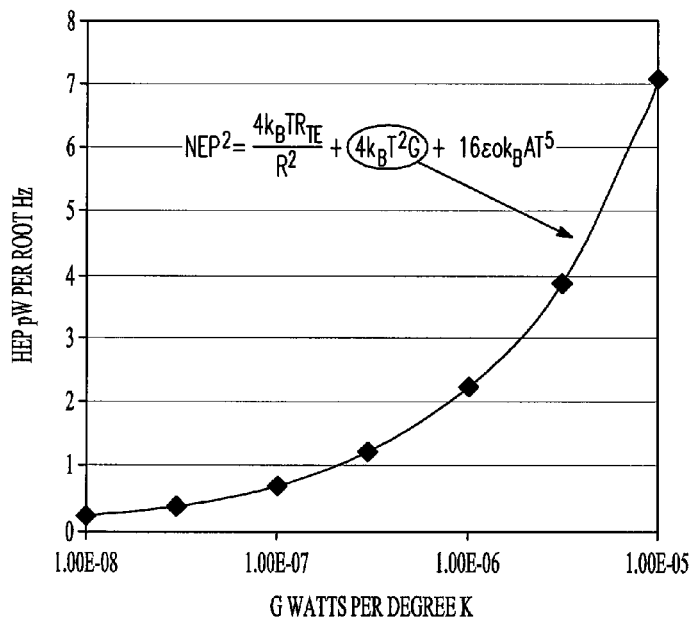
FIG. 6 is a graph illustrating sensor thermal performance versus thermal isolation.

The thermal noise, $4k_BT^2G$, is the theoretically limiting noise (i.e., whereas the other noise components could theoretically be reduced to zero, there will always be thermal noise). FIG. 6 is a graph plotting the theoretically limiting thermal noise as a function of thermal conductivity of the microbridge (which is a function of many factors, including, but not limited to, the material out of which the bridge is fabricated, its length, thickness, width, and mass). As can be seen in FIG. 6, the thermal noise can be brought below 1 pW/√Hz for microbridge materials having a thermal conductivity, G, below about 0.13 microwatts per degree Kelvin.

The thermal conductivity of the microbridge can be lowered by increasing the length of the isolation legs or making them thinner and less massive. However, there are trade-offs between lower thermal conductivity and impedance. Particularly, lower thermal conductivity typically results in higher impedance of the microbridge. The temperature induced voltage differential, however, must be read out by the read-out electronics electrically coupled to the microbridge and, therefore should be impedance matched to it. Generally, the higher the thermal impedance of the bridge, the slower the thermal response time. Lower thermal conductivity also generally will go hand in hand with increased complexity and cost of fabrication. That is, thermal conductivity typically is increased by making the bridge with smaller dimensions, which generally makes the microbridge more complicated to fabricate and more flimsy and prone to breakage and other forms of failure. Accordingly, the thermal conductivity must be traded off against increased impedance, reliability, and fabrication complexity.

Figure 7:
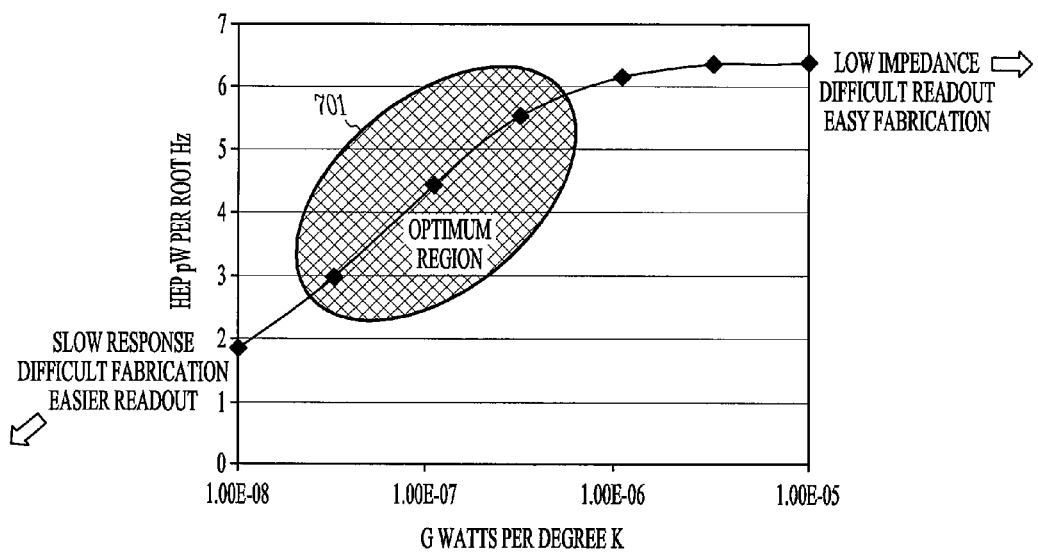
FIG. 7 is another graph illustrating sensor thermal performance versus thermal isolation and showing an optimal range of thermal isolation taking into consideration various countervailing performance features.

FIG. 7 is another graph showing NEP plotted against thermal conductivity for the FIG. 5 embodiment of the invention. Shaded area 701 indicates the optimal region where both the impedance of the bridge and its thermal conductivity are acceptable.

Figure 8A:
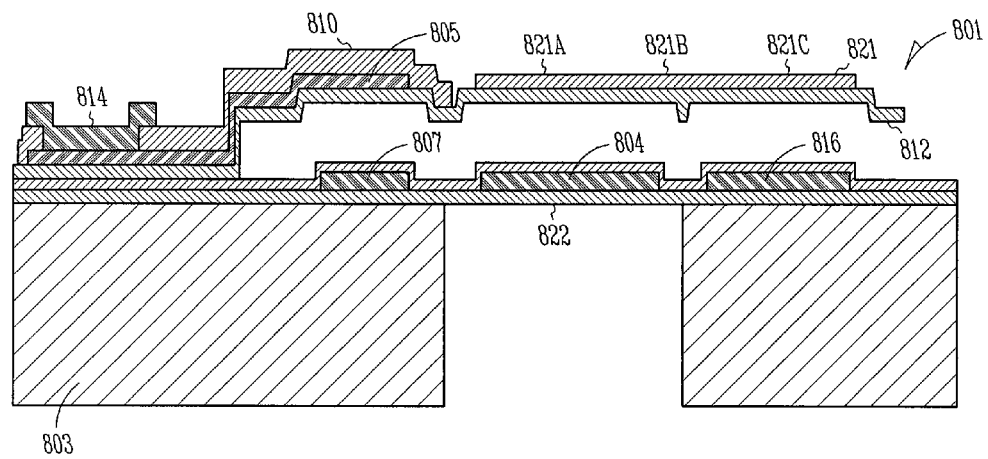
FIGS. 8A and 8B are side elevation and overhead plan views, respectively, of the microstructure, coupling mechanism, and temperature signal detector of the sensor of FIGS. 2A and 2B in accordance with a third embodiment of the invention.
Figure 8B:
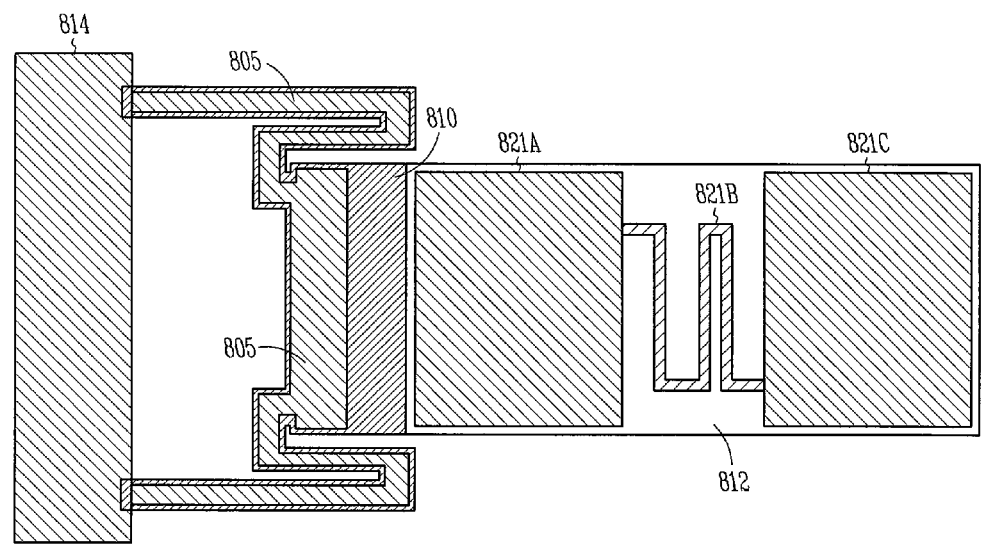

FIGS. 8A and 8B are side elevation and plan views, respectively, of the thermally isolated microstructure, coupling mechanism, and temperature signal detector in accordance with an alternative embodiment of the invention based on the use of thermal bimorph laminates (a stack of films comprised of two or more materials with significantly different coefficients of thermal expansion). In this embodiment, the microbridge is implemented as a thermal bimorph laminated beam 801 cantilevered over the substrate 803. A central region of the beam, which may extend laterally over the substrate, bears a metalized portion 805. The metalized portion is suspended over another metal plate 807 on the surface of the substrate. The beam is capacitively coupled to the antenna pads 804, 816 on the substrate. Similarly to the FIG. 5 embodiment, the current running through the antenna contact pads 804, 816 as the result of any radiation received by the micro antenna elements and transferred to the antenna pads will cause a voltage change in the antenna pads 804, 816 that is transferred capacitively to the top metal layer 821. Specifically, the top metal layer 821 comprises a first large area 821a that essentially forms the top plate of a capacitor formed with bottom plate 804 and a second large area 821c that essentially forms the top plate of a second capacitor formed with bottom plate 816. This voltage differential causes a current in the metal layer 821 that ohmically heats up serpentine metal portion 821 between the two capacitor plates 821a and 821b on the microstructure. Serpentine metal portion 821b between the two capacitor plates essentially acts as a resistor between the two plates 821a, 821b. The thermal bimorph beam, being fabricated of at least two materials 810, 812 having different thermal coefficients, deforms in response to the temperature change. The metal plate 807 on the substrate and the other metalized portion 805 of the beam form the two plates of another capacitor. The deformation of the beam changes the distance between the two capacitor plates 805, 807, thus resulting in a change in the voltage across the two plates of the capacitor. The voltage across the capacitor is coupled out to the read-out electronics via pad 814, as in the previously described embodiments and is indicative of the amount of radiation picked up by the antenna.

Alternately, a method of active feedback can be used wherein a voltage is applied to the capacitor plates 805, 807 such as to maintain a constant capacitance, and the applied voltage, having a fixed functional relationship to the thermally-induced bending of the beam, can be used as the read-out signal. [U.S. Pat. No. 6,392,233, for instance, discloses this type of detection system as used in connection with thermal IR detectors.]

In an even further embodiment of the invention, the microstructure may function in accordance with piezoelectric principles. In such an embodiment, the microbridge is replaced with a cantilevered piezoelectric beam cantilevered over the substrate 803. The end of the beam bears a metalized portion. The metalized portion is suspended over another metal plate on the surface of the substrate. The beam is ohmically connected to the antenna pads on the substrate so as to be exposed to heat in response to radiation picked up by the antenna (essentially as previously described in connection with the FIG. 4 and FIG. 5 embodiments). The beam may be fabricated of a piezoelectric material so as to deform responsive to a voltage applied across it. The metal plate 807 on the substrate and the metalized portion 805 of the beam form two plates of a capacitor. The deformation of the beam changes the distance between the two capacitor plates 805, 807, thus resulting in a change in the voltage across the capacitor. The voltage across the capacitor is coupled out to the read-out electronics as in the previously described embodiments and is indicative of the amount of radiation picked up by the antenna.

The present invention provides a platform from which a THz range radiation sensor can achieve noise equivalent power of less than 1 pW/√Hz. Some of its advantages over other existing or potential techniques include the fact that the thermoelectric microbridge type detector has no 1/f noise because there is no bias current needed to create a bias voltage in the detector. This also means that there is no bias-induced sensor heating in this design. Also, since the thermocouple (the hot TE junction) is always paired with another thermocouple (the cold TE junction) on the substrate, there is no offset voltage in this design. It is self calibrating.

The design is relatively simple. Even further, the sensor output is a direct DC voltage output (because it is a thermocouple). No temperature stabilization is needed because there is a reference thermocouple on the substrate very close to the microbridge. For the same reason, there is no need for a shutter to chop the sensor output. Additionally, the low thermal mass of the microbridge structure permits very fast readout of the sensor output, if desired. Furthermore, the thermoelectric microbridge design of the present invention has an enormous dynamic range. It is very difficult to saturate the voltage in a thermocouple by overheating.

The impedance of the microbridge should be matched to the impedance of the micro antenna in order to provide good coupling efficiency.

How the data obtained by the sensor or sensor array is then further analyzed (either in the processor 124 of the exemplary spectrometer embodiment of FIG. 1 or other processing equipment depends on the particular application). Merely as an example, if the sensor is embodied in a spectrometer used in an airport security system for scanning individuals for prohibited items, then the data might be analyzed to determine if a person has plastic explosives, metal, or poisonous gas on his or her person. This would be done by analyzing the emission and/or absorption line spectral image of the person for the signature spectral image of the atoms or molecules making up such substances.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

The invention claimed is:

1. A sensor for detecting radiation comprising:
   a substrate;
   a micro antenna positioned on a membrane, the membrane stretched over a hole etched into said substrate;
   a microstructure formed on and suspended apart from said substrate;
   a means for coupling energy received by said micro antenna into said microstructure;
   a first thermocouple positioned on said microstructure adapted to detect temperature change and generate a temperature change signal in response thereto; and
   read out electronics coupled to receive said temperature change signal.

2. The sensor of claim 1 wherein said membrane comprises a pellicle.

3. The sensor of claim 1 wherein said first thermocouple is positioned on said microstructure apart from where said microstructure contacts said substrate.

4. The sensor of claim 1 wherein said first thermocouple is formed at a center of said microstructure and wherein said sensor further comprises a second thermocouple on said substrate and wherein said read out electronics are coupled to said first and second thermocouples.

5. The sensor of claim 1 wherein said microstructure is impedance matched to said micro antenna.

6. The sensor of claim 1 wherein said means for coupling comprises ohmic contacts.

7. The sensor of claim 6 wherein said means for coupling comprises first and second electrically conductive contact pads on said substrate in electrical contact with said microstructure.

8. The sensor of claim 1 wherein said means for coupling comprises capacitive couples.

9. The sensor of claim 8 wherein said capacitive couples comprises first and second capacitive couples, each capacitive couple comprising:
    a first capacitive plate on said microstructure suspended above said substrate;
    a second capacitive plate on said substrate positioned below said first capacitive plate in order to capacitively couple to said first capacitive plate, wherein said second capacitive plate is electrically coupled to said micro antenna.

10. The sensor of claim 9 wherein said microstructure comprises a bridge that is in contact with said substrate at opposing ends thereof and is suspended above said substrate between said opposing ends, said bridge comprising:
    a first, non-conductive base material formed in a shape of said microstructure;
    a first portion of said first material covered with a second, electrically conductive material; and
    a second portion of said first material covered with a third, electrically conductive material selected relative to said first material so as to form a thermocouple there with
    wherein said first and second portions of said microstructure overlap to form said first thermocouple; and
    wherein said first capacitive plate of said first capacitive couple is part of said first portion of said microstructure and said first capacitive plate of said second capacitive couple is part of said second portion of said microstructure.

11. The sensor of claim 10 wherein said micro structure contacts said substrate at first and second contact points in said first and second portions of said microstructure, respectively, and each of said first capacitive plates is separated from said respective contact point by a serpentine leg suspended above said substrate and wherein said thermocouple is separated from each of said respective first capacitive plates of said first and second capacitive couples by a serpentine leg of said microstructure.

12. The sensor of claim 11 wherein said first material is silicon nitride, said second, electrically conductive material is NiFe and said third, electrically conductive material is chrome.

13. The sensor of claim 1 wherein said micro antenna is configured to receive radiation in the THz range.

14. The sensor of claim 1 wherein said micro antenna is configured to receive radiation in the range of about 0.1 THz to about 20 THz.

15. The sensor of claim 14 wherein said micro antenna comprises:
    at least one antenna element suspended above an opening in said substrate; and
    a microstrip coupled to said coupling means.

16. The sensor of claim 1 wherein said microstructure comprises a beam cantilevered over said substrate formed of a material so as to deform in response to one of a voltage applied across it or a temperature change and bearing a metalized portion and wherein said temperature change detector comprises said metalized portion of said microstructure and a metal plate on said substrate beneath said metalized portion of said microstructure so as to capacitively couple to each other.

17. The sensor of claim 16 wherein said material of said microstructure comprises a piezoelectric material such that said microstructure deforms responsive to a voltage applied across said microstructure.

18. The sensor of claim 16 wherein said microstructure is formed of two metal layers having different thermal coefficients such that said microstructure deforms responsive to a temperature change of said microstructure.

19. An integrated circuit comprising a sensor for detecting radiation, said integrated circuit comprising:
    a substrate;
    a micro antenna positioned on a membrane, the membrane stretched over an opening etched into said substrate;
    a microstructure formed on and suspended apart from said substrate;
    a means for coupling energy received by said micro antenna into said microstructure;
    a thermocouple positioned on said microstructure adapted to detect temperature change and generate a temperature change signal in response thereto; and
    electrical contacts coupled to receive said temperature change signal.

20. A sensor for detecting radiation comprising:
    a substrate;
    a micro antenna positioned on a membrane, the membrane stretched over a hole etched into said substrate;
    a microstructure formed on and suspended apart from said substrate;
    a contact pad for coupling energy received by said micro antenna into said microstructure;
    a thermocouple positioned on said microstructure adapted to detect temperature change and generate a temperature change signal in response thereto; and
    read out electronics coupled to receive said temperature change signal.

* * * * *